2,841,959
Patented July 8, 1958

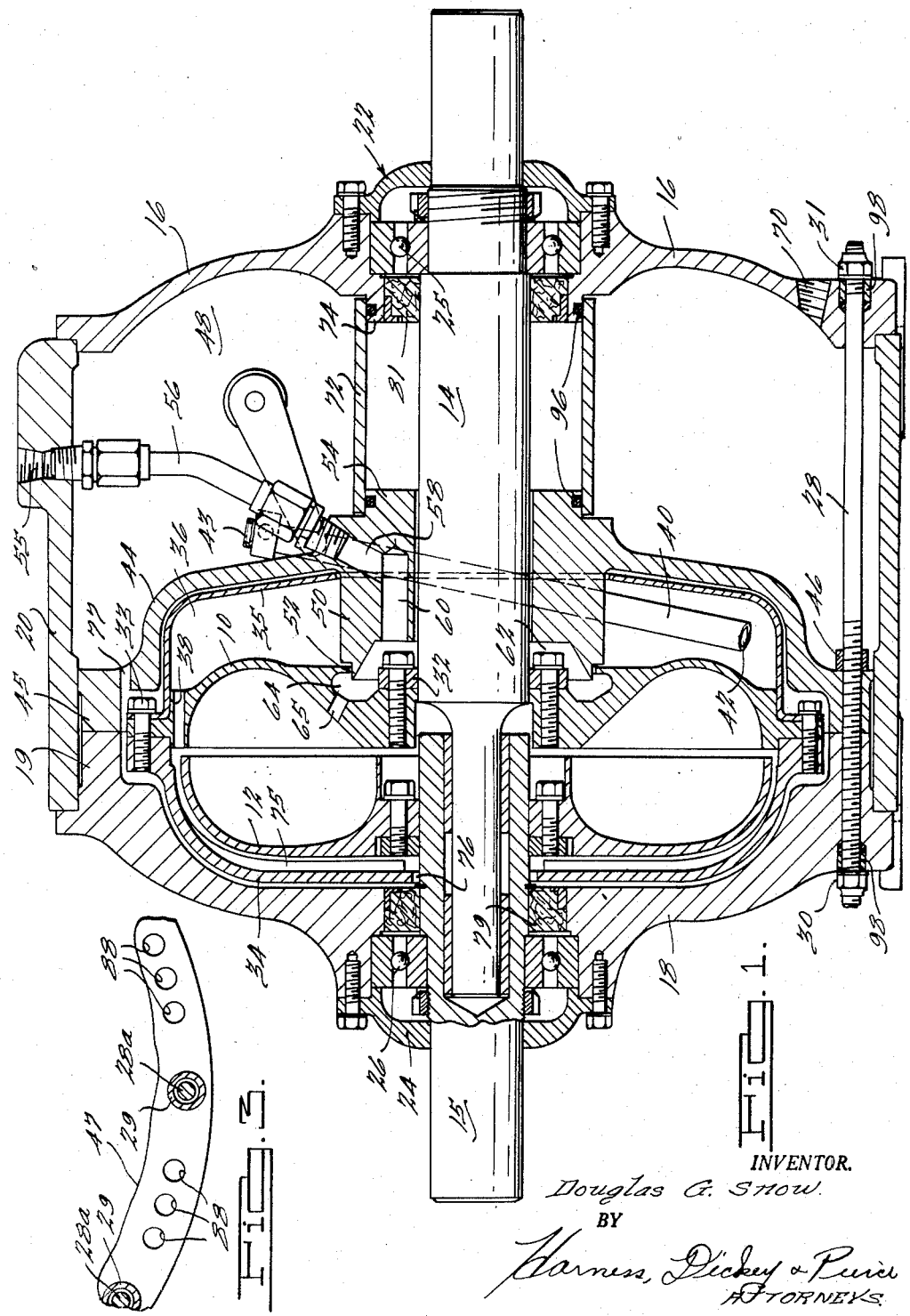

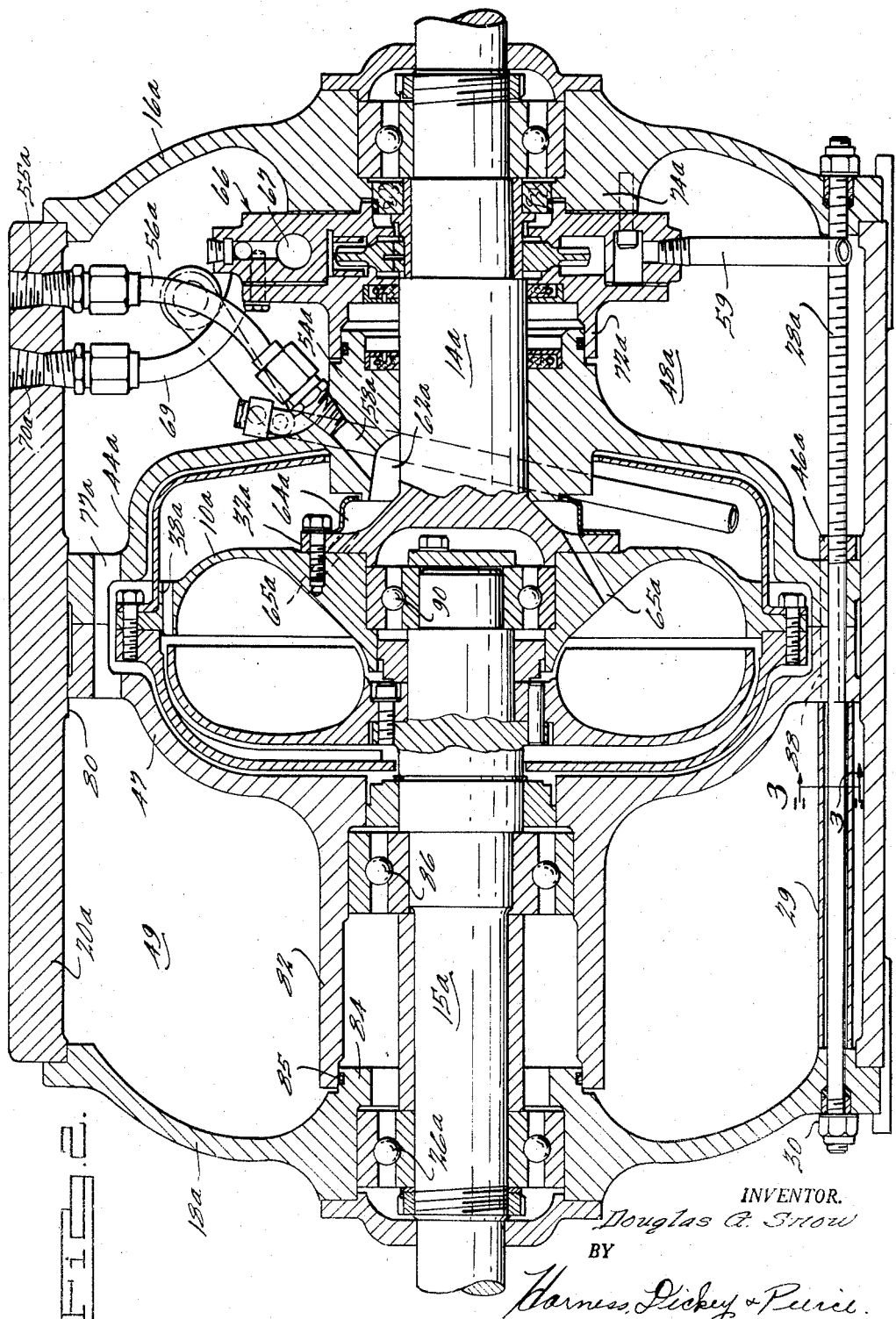

2,841,959
FLUID COUPLING

Douglas G. Snow, Holly, Mich., assignor, by mesne assignments, to Gilbert E. Nelson, Holly, Mich.

Application November 26, 1954, Serial No. 471,357

5 Claims. (Cl. 60—54)

The present invention relates to hydraulic coupling mechanisms of the variable-speed type, and particularly to an improved integrated coupling and reservoir construction.

An important object of the invention is to provide an improved coupling and reservoir assembly which is extremely compact, which is adapted to be contained in a single casing, and the parts of which are so arranged that the dimensions of the assembly may be made to conform to those of conventional electric motors with which the unit is designed to be used, yet which is also arranged so that no portions of the rotary coupling structure are required to rotate in the hydraulic fluid, and frictional drag is reduced to a very low order.

Another object is to provide an improved assembly including concentrically arranged coupling and reservoir portions so designed that the need for external piping is largely eliminated, danger of leakage is reduced, the labor involved in installation is minimized, and the space consumed by the unit is also reduced.

Still another object is to provide such an assembly which is of very rugged construction, and the parts of which are readily accessible and disassemblable for servicing.

Other objects and advantages of the present invention will become apparent upon consideration of the present disclosure in its entirety.

In the drawings:

Figure 1 is a lonigtudinal diametrical sectional view of a variable-speed coupling and reservoir assembly incorporating the principles of the present invention; and Fig. 2 is a similar view of a modified construction.

Referring now to the drawings, and particularly to Fig. 1, a fluid coupling is illustrated which, per se, is of conventional construction and comprises an impeller, generally designated 10, and a runner, generally designated 12, the circuit contours of which conform to the disclosure of Blank & Nelson Patent No. 2,562,657, granted July 31, 1951. The impeller is fast upon a driving shaft 14 which is concentric with, and piloted in, the driven shaft 15, to which the runner 12 is secured.

The casing structure is defined by a pair of circular end bells 16, 18, coaxially mounted at the extremities of a cylindrical casing sleeve 20 and each provided with bearing housing means generally designated 22, 24, respectively, for antifriction bearing means 25, 26, by means of which the shafts 14 and 15 are respectively journaled in the casing structure. The end bells are tightly drawn against, and sealed with respect to, the ends of the casing sleeve 20 by headless stay bolts as 28 which project through aligned apertures in the end bells. Nuts 30, 31 are tightened upon the projecting threaded extremities of the stay bolts to clamp the end bells.

The impeller 10, which is bolted to a flange 32 formed near the piloted end of the shaft 14, carries a rotary casing structure secured to its periphery by bolts 33 and which comprises a rotary casing portion 34 which closely envelopes and projects inwardly around the runner 12, extending to a position close to, but spaced from, driven shaft 15, and a rotary casing wall 35 which extends rearwardly from the impeller 10 and thence inwardly at a distance from the impeller to define a rotary chamber 36. Chamber 36 communicates with the working circuit, apertures as 38 being provided near the periphery of the impeller to establish such communication, and the amount of fluid in the chamber 36, and accordingly in the working circuit, is controllable by means of a slidable scoop tube 40 which is mounted in a manner presently to be described and which has a radial component of movement so that its scoop end 42 in the chamber 36 is movable inwardly and outwardly.

The left end bell 18 forms one half of the stationary casing for the coupling. A cylindrical flange portion 19 integrally carried by the end bell 18 near the periphery thereof projects inwardly around the coupling. The other half of the stationary housing for the coupling is formed by an inner partition bell 44 which is fitted inside the housing sleeve 20. A cylindrical flange portion 45 of the bell 44 projects toward and bears against the free end of the partition 19, the abutting surfaces of the flange portions 19, 45 being accurately faced so that when clamped together they coact to complete a fluid tight enclosure for the coupling. The stay bolts 28 also extend through longitudinal openings in the periphery of partition bell 44. Each stay bolt is provided with an abutment, shown as a nut 46, adapted to bear against the right end surface of the bell 44.

In assembling the casing structure, the nuts 46 are preliminarily fixed to position upon the stay bolts and the outer nuts 30 at the left end of the assembly are drawn tight before the right end nuts 31 are tightened. The tightening of the nuts 30 draws the abutment nuts 46 and inner bell 44 to the left, clamping the bell 44 to the bell 18 to form a tight enclosure for the coupling. The casing sleeve 20 is substantially longer than the stationary housing structure for the coupling and the space between the bells 44—16 defines a liquid reservoir 48 which is isolated from the coupling by the inner bell 44.

A stationary hub portion 50 integral with the inner bell 44 projects inwardly through the rotary housing portion 35 and into interfitted relation with a lip flange 52 formed upon and projecting radially inwardly from the right end wall of the impeller 10 and having close running clearance with the inner extremity of the hub 50. A hub portion 54, also integral with the partitioning bell 44 projects axially outwardly therefrom and into the reservoir chamber 48. A liquid inlet port 55 extends through the wall of the casing sleeve 20 and is connected by a tube 56 and suitable couplings to a port 58 which extends angularly, both radially and axially, inwardly from the periphery of the outer hub 54 of the partitioning bell 44 to a position inside the inner hub 50, where it communicates with a longitudinal passage 60 which is open at the inner end of hub 50 within a communicating chamber formed by a countersunk portion 62 at the end of hub 50.

The countersunk portion 62 communicates with an annular chamber 64 formed in the wall of the impeller and which in turn communicates through passages 65 with the working circuit. It will thus be seen that fluid may be forced into the coupling through the inlet 55 and the connections just described.

The ports 38 in the periphery of the impeller are substantially unrestricted, and when the coupling is in operation the annular ring of liquid in the rotary chamber 36 tends to hold a radial thickness which conforms to the position of the scoop tube portion 42, the amount of liquid in the working circuit being thus governed.

The fluid is ejected from the open inner end 43 of the scoop tube into the reservoir, from which it may be pumped by suitable pumping means (not shown) through an outlet port 70 in the end bell 16 near the bottom of the casing. A suitable cooler (not shown) may be connected in series with the pump between the outlet 70 and the inlet 55 to complete the working circuit and to cool the oil prior to its return to the coupling through the inlet passages previously described, although such components are well known and will require no elaboration.

Suitable fluid sealing and retaining means are provided, including the sleeve 72 surrounding and overlapping both hubs 54, 74 and sealed wth respect thereto as by O-rings 96. Seal assemblies 79, 81 are also fitted in the hubs of end bells 18, 16 between the interior thereof and bearings 25, 26, respectively. Seals as 98 may also be fitted on the bolts 28 beneath the nuts 30, 31.

The tendency of fluid to be forced out of the rotary casing structure 34, under high pressure conditions such as obtain at stall, is opposed by radial pumping vanes 75 carried by the inner wall of the shroud 34. There is of course very little tendency for fluid to escape between the drum 35 and the hub 50, except for such small amount as may at times be splashed into this region. If any fluid does escape through the opening 76 formed by the running clearance between the shroud 34 and the driven shaft 15, or through the running clearance between drum 35 and hub 50, it is forced outwardly under the pumping action of the rotating parts and escapes into the reservoir chamber 48 through openings 77, provided in and near the periphery of the bell 44 in the area above the liquid level in the reservoir chamber.

It will be understood that the level of fluid in the reservoir 48 is at its maximum when the scoop tube 40 is in its most extended position, which is also its lowest position. The scoop tube is accordingly made as long as possible, and the escape opening 43 is located at its upper extremity so that when the scoop tube is fully extended (declutched position) the reservoir will contain the full quantity of oil in the area below the level of the position then occupied by the outlet opening 43 of the scoop tube. It will also be observed that the scoop tube is positioned as nearly vertical as feasible, and that these factors make it possible to attain the maximum effective reservoir capacity in proportion to length. These factors also enable the attainment of sufficient effective reservoir capacity within a reservoir concentric with the coupling and of a relatively small diameter, and which is nevertheless short in length. I am in this manner able to proportion the entire assembly so that the distance from the base of the assembly to the shaft axis is the same as the corresponding shaft height of a standard electric motor of the induction type and of the horsepower which the coupling is designed to handle. Thus the entire coupling and reservoir assembly can be mounted level with the motor and directly coupled thereto.

In the modified construction shown in Fig. 2, parts analogous to those already described are designated by like reference characters distinguished by the addition of the letter "a." The casing sleeve 20a, in this embodiment, is longer in proportion than in the first described embodiment, and the coupling is located in an intermediate position, in a stationary casing defined by two inner partitioning bells. The right-hand partitioning bell is designated 44a and the left-hand partitioning bell is designated 47. The end bells 16a, 18a are similarly fitted into and against the ends of the casing sleeve 20a and held in tight clamping engagement therewith by through bolts 28a. Abutments 46a on the bolts confine the partitioning bell 44a, while the left partitioning bell 47 is forced into fluid-tight engagement with the bell 44a by suitable thrust means, shown as comprising tubes 29, one such tube being fitted on each bolt between the left end bell 18a and partitioning bell 47. Tubes 29 are of such length that when the nuts 30a, which are applied last, are tightened, the bell 47 is forced against the bell 44a at the same time that the bell 18a is tightened against the sleeve 20a. The peripheral portions of the bells 44a and 47 are accurately located by a bored cylindrical pad 89 upon the inner wall of the sleeve 20a. Bell 47 is provided with an integral elongated hub sleeve 82 which projects into overlapping accurately interfitted engagement with a cylindrical flange portion 84 of the end bell 18a. A sealing ring 85 is interposed between the portions 82, 84 and the driven shaft 15a is supported by a bearing 26a corresponding to the bearing 26 of the first embodiment and also by an antifriction bearing assembly 86 positioned upon the shaft within the hub sleeve 82.

The reservoir space 48a between the bells 44a—16a is augmented by the space, designated 49, between the bells 47—18a, these spaces being in communication with one another below the liquid level in the reservoir through suitable aligned openings as 88 formed (between the holes for bolts 28a) in the peripheral portions of the bells 44a—47. Openings 88 do not intersect the interior of the coupling chamber. Above the liquid level in the reservoir, openings 77a are formed in the peripheries of partitioning bells 44a—47 in such positions as to intersect the interior of the stationary coupling chamber, and through these any fluid which leaks into such chamber is immediately ejected by the pumping action of the rotating coupling.

It will be appreciated that in some applications the relatively large reservoir space of this embodiment will provide for ample cooling of the oil without the need for any external cooler. In the illustrative construction depicted in Fig. 2 the oil is circulated by a pump 66 mounted inside the casing on the sleeve 72a, which is supported in a position coaxially surrounding the driving shaft 14a, upon suitable hub flange portions 54a, 74a, formed integrally with and projecting inwardly in opposite directions from the bells 44a, 16a respectively. The pump 66, shown as of the radial type, draws fluid from the bottom of the reservoir through a riser pipe 59, and pumps it (through intermediate passages to be described) into the inlet passage 58a, from which it is delivered through chamber portions 62a, 64a and passages 65a into the interior of the working circuit in a manner which corresponds to the delivery of fluid into the coupling in the first embodiment.

In order to enable convenient connection of a cooler into the circuit if it should be required, the passage 58a is connected by tube 56a to an inlet port 55a in the sleeve 20a, and the pump outlet line 67 is connected by a tube 69 to a port 70a in the sleeve 20a. When no cooler is required, the ports 55a—70a are directly connected to one another, while if a cooler is required, it is of course simply connected between these ports.

In this embodiment the driven shaft is shown as piloted in an antifriction bearing 90 in the impeller 10a, the impeller being bolted to a flange 32a integral with the inner end of the driving shaft 14a.

In my improved coupling mechanisms, the stationary casing structure for the coupling elements and rotary drum is only slightly larger than such rotary components, but all of the working fluid is taken directly from the drum by the scoop tube, through the axially positioned hub, and no fluid except a small amount of leakage ever enters the space between the rotary components and the stationary casing for the coupling, so there can never be enough fluid between the rotary parts and the stationary housing structure to create any frictional drag. The scoop tube drag is also inconsequential, for the reason that the scoop tube is never substantially immersed in the oil.

While it will be apparent that the preferred embodiments of the invention herein described are well calculated to fulfill the objects and advantages first above stated, it will be appreciated that the invention is susceptible to variation, modification and change without departing from the fair meaning and proper scope of the appended claims.

I claim:

1. In a hydraulic coupling assembly, a fixed housing defining a reservoir within which liquid is normally maintained at a level below the top, an internal housing structure located at least partially within said reservoir and fixed with relation thereto, and defining a coupling chamber, a fluid coupling within and fitted relatively closely with respect to said coupling chamber, passage-defining portions providing communication between a portion of said reservoir above the liquid level therein and the interior of said coupling chamber and located outside the peripheral area of the coupling, to permit ejection of fluid from the chamber into the reservoir by the pumping action resulting from rotation of the coupling, the reservoir being substantially sealed, the portion of the coupling chamber below said passage-defining portions being effectively isolated from the lower portion of the reservoir, and means for feeding fluid into the coupling and for removing fluid from the coupling through transfer passages located in the vicinity of the axis of rotation of the coupling.

2. In a hydraulic coupling structure, a substantially cylindrical fixed reservoir, a fixed circular coupling chamber-defining structure concentric with said reservoir, common external wall portions confining said coupling chamber and reservoir, a fixed partition within said wall portions segregating said chamber and reservoir, a fluid coupling rotatable within said chamber, a fluid drum within said chamber and rotatable with said coupling, said coupling and drum being fitted relatively closely with respect to said chamber, substantially unrestricted discharge ports being provided connecting a peripheral portion of the coupling with the interior of said drum, the interior of the drum and coupling being unconnected with the interior of said chamber, a hub structure extending through said partition and drum and fixed with respect to said casing, a scoop tube carried by said hub structure and having a radial component of movement within said drum, said scoop tube discharging into said reservoir through said hub structure, means for injecting fluid from the reservoir through the hub structure into the coupling, and means for ejecting from said chamber and into the reservoir any fluid which leaks into said chamber.

3. In a structure as defined in claim 2, passage defining portions providing communication between said chamber and reservoir and located above the coupling to permit ejection of fluid from the chamber into the reservoir by the pumping action resulting from rotation of the coupling and drum, the portion of the chamber below said passage defining portions being effectively isolated from the lower portion of the reservoir.

4. In a hydraulic coupling structure, a substantially cylindrical casing comprising a sleeve, end bells for closing the ends of said sleeve, a partition within the casing segregating the space therewithin into two compartments, one of said compartments comprising a reservoir within which oil is normally maintained at a level below the top, and the other of said compartments comprising a coupling housing coaxial with said sleeve and reservoir, a fluid coupling closely fitted in and coaxially rotatable in said coupling housing, a rotary oil drum also within said housing and rotatable with the coupling, a hub portion carried by said casing and projecting into said housing and having fluid passages therein for conducting fluid to the coupling and for removing fluid from the drum, a scoop tube having a radial component of movement within the drum, means for circulating fluid from the scoop tube through the reservoir and back to the coupling, peripheral opening portions being provided in the coupling maintaining substantially unrestricted communication between the interior of said coupling and said drum, and means for ejecting from said chamber and into the reservoir any fluid which leaks into said chamber.

5. A coupling structure as defined in claim 4 wherein said ejecting means comprises escape passageway-defining portions connecting the interior of said housing with the reservoir above the liquid level in the latter.

References Cited in the file of this patent

UNITED STATES PATENTS

| 1,616,252 | Bratvold | Feb. 1, 1927 |
| 1,910,697 | Kiep | May 23, 1933 |
| 2,151,075 | Berger | Mar. 21, 1939 |
| 2,226,801 | Black | Dec. 31, 1940 |
| 2,491,483 | Dolza et al. | Dec. 20, 1949 |
| 2,719,616 | Ahlen | Oct. 4, 1955 |

FOREIGN PATENTS

| 687,658 | Germany | Feb. 3, 1940 |